United States Patent [19]
Ecclesfield

[11] Patent Number: 5,464,197
[45] Date of Patent: Nov. 7, 1995

[54] TORSION SPRING HAVING AN ADJUSTABLE SPRING RATE

[76] Inventor: George Ecclesfield, 2088 Park Marina Dr., Redding, Calif. 96001

[21] Appl. No.: 290,387

[22] Filed: Aug. 15, 1994

[51] Int. Cl.⁶ ........................................... F16F 1/06
[52] U.S. Cl. ........................... 267/155; 267/275; 267/168
[58] Field of Search ..................... 267/157, 154, 267/155, 175, 177, 250, 255, 273, 275, 277, 278, 289, 291, 168

[56] References Cited

U.S. PATENT DOCUMENTS

| 736,333 | 8/1903 | Meyer | 267/155 |
|---|---|---|---|
| 3,337,183 | 8/1967 | Horneck et al. | 267/157 X |
| 4,155,547 | 5/1979 | Savio et al. | 272/67 |
| 4,439,946 | 4/1984 | Altier | 267/155 X |
| 4,900,019 | 2/1990 | Shamir | 272/138 |
| 4,907,506 | 3/1990 | Davis et al. | 101/115 |
| 4,912,783 | 4/1990 | Shafer | 4/251 |
| 5,052,404 | 10/1991 | Hodgson | 267/155 X |
| 5,176,370 | 1/1993 | Yamamoto | 267/154 |

FOREIGN PATENT DOCUMENTS

| 0153873 | 6/1951 | Australia | 267/157 |
|---|---|---|---|
| 0473149 | 3/1929 | Germany | 267/168 |
| 0047030 | 4/1980 | Japan | 267/275 |

OTHER PUBLICATIONS

Von Nostrand's Scientific Encyclopedia, 1968, p. 1711.
Shingly and Mitchell, "Helical Torsion Springs", 1983, McGraw Hill Series in Mechanical Engineering pp. 469–472.

Primary Examiner—Robert J. Oberleitner
Assistant Examiner—Peter M. Poon
Attorney, Agent, or Firm—Bernhard Kreten

[57] ABSTRACT

A helical torsion spring is provided having an adjustable spring rate. The torsion spring includes a main spring formed from a coil of wire having a first end and a second end. The wire extends away from the first end to form a first arm and away from the second end to form a second arm. The main spring is loaded torsionally by angular displacement of the first arm with respect to the second arm about a central axis passing through a geometric center of the coil. An inside diameter of the coil defines a core. An adjustment spring is oriented within the core. The adjustment spring is formed from adjustment spring wire configured in a manner similar to that of the main spring. The adjustment spring exhibits an exterior diameter not less than the inside diameter of the main spring. The adjustment spring is rotatable to threadably adjust a proportion of the core of the main spring that includes the adjustment spring therein.

19 Claims, 2 Drawing Sheets

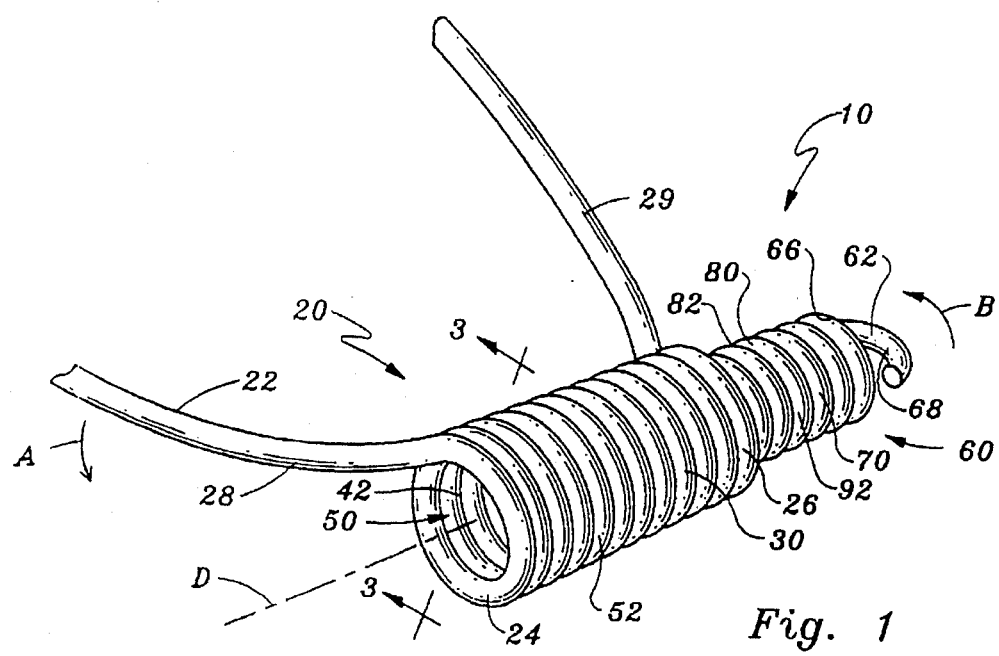
Fig. 1
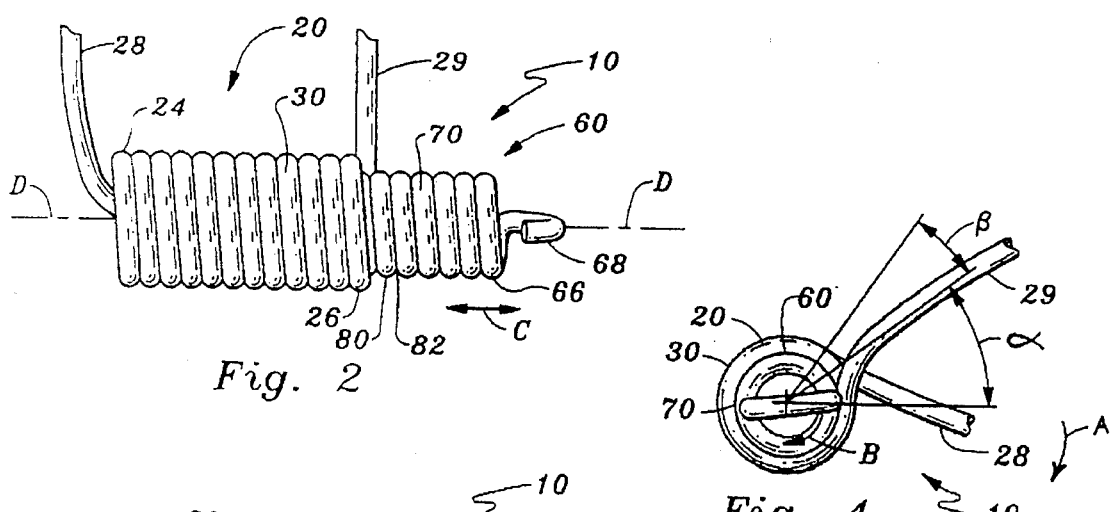
Fig. 2
Fig. 4
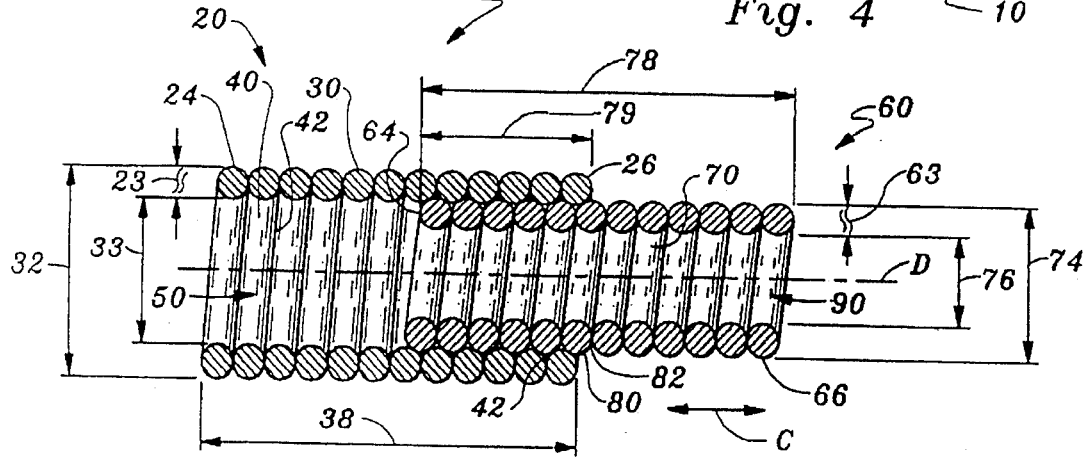
Fig. 3

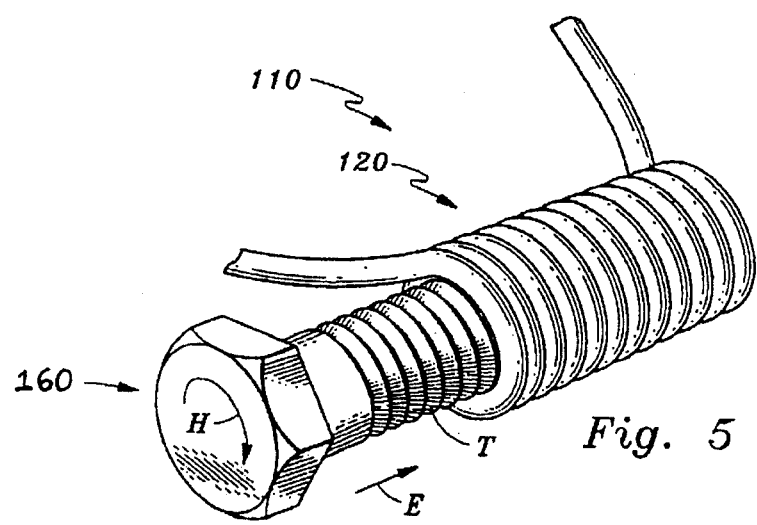
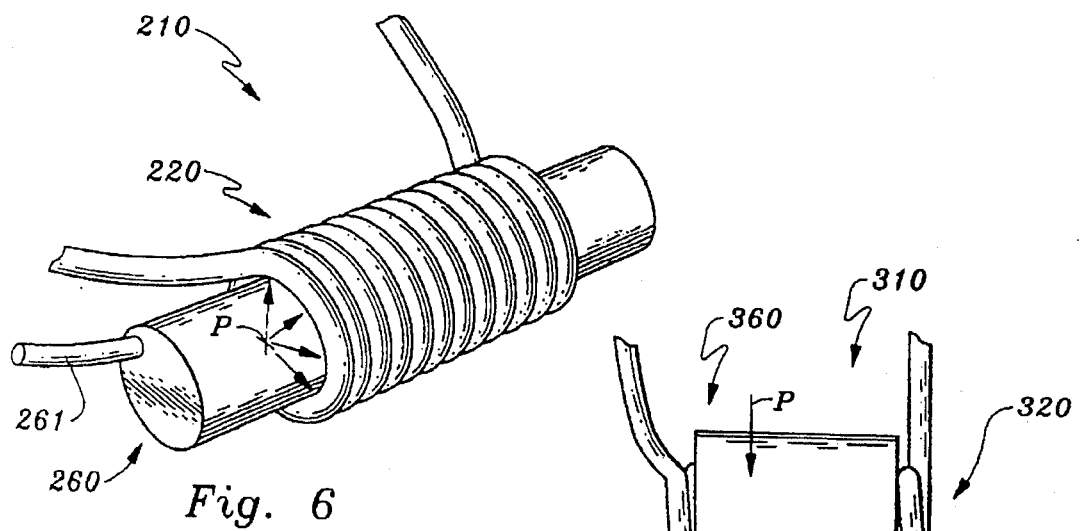
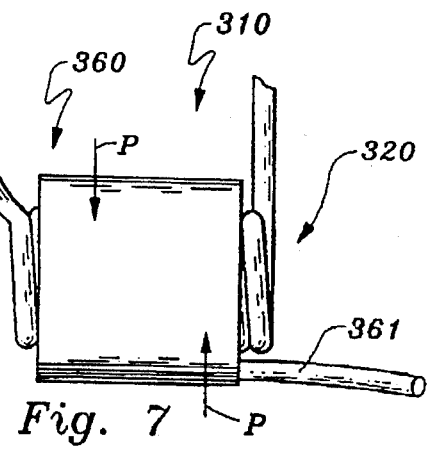
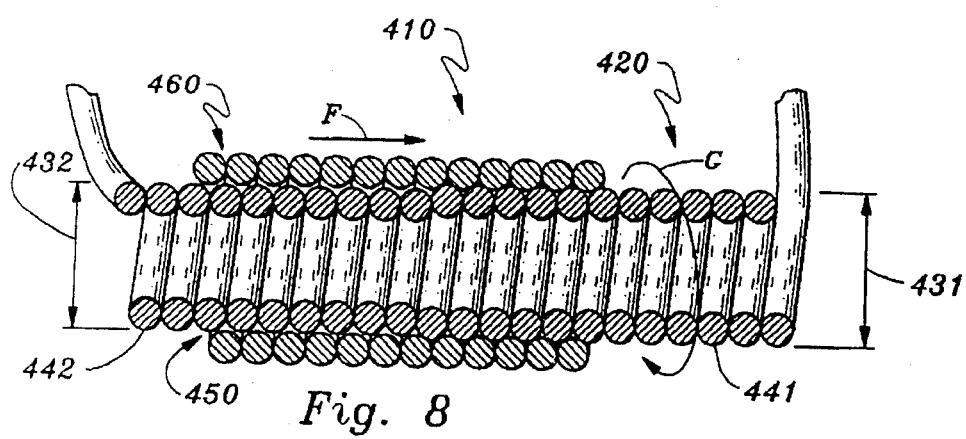

5,464,197

TORSION SPRING HAVING AN ADJUSTABLE SPRING RATE

FIELD OF THE INVENTION

The following invention relates to torsion springs and mechanical elements which provide resistance to rotational motion. More specifically, this invention relates to torsion springs having a spring rate which is adjustable to provide the torsion spring with the desired rotation resisting characteristics.

BACKGROUND OF THE INVENTION

Torsion springs are known in the art which are provided as basic mechanical elements for resisting rotational motion. Torsion springs can be used for a variety of purposes including storage of energy, exerting torque within a mechanical system, providing flexibility for a mechanical system, and providing power for machines such as clocks and "wind-up" toys.

Each torsion spring, depending on the materials from which it is formed and its geometrical configuration, has a spring rate. The spring rate is usually substantially constant over the operating range of the spring. The spring rate represents how much torque is required to angularly displace ends of the torsion spring with respect to each other. The larger the spring rate, the greater the torque required to angularly displace the ends of the torsion spring.

In the design of mechanical systems which include torsion springs, a torsion spring is selected having a spring rate which produces the desired characteristics for the mechanical system. Often, the optimal spring rate for the mechanical system is not constant, but rather is a variable quantity. Torsion springs are known in the art which have a variety of different spring rates. However, each spring geometry and material configuration results in a unique, substantially constant spring rate. Accordingly, the machine designer selecting from prior art torsion springs must compromise and select a torsion spring which may not be optimal for all modes of operation of the machine incorporating the torsion spring. Accordingly, a need exists for a torsion spring having a spring rate which is adjustable to provide optimum performance characteristics over a broader range of operating conditions.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| U.S. Pat. No. | ISSUE DATE | INVENTOR |
| --- | --- | --- |
| 4,155,547 | May 22, 1979 | Savio, et al. |
| 4,900,019 | February 13, 1990 | Shamir |
| 4,907,506 | March 13, 1990 | Davis, et al. |
| 4,912,783 | April 3, 1990 | Shafer |
| 5,176,370 | January 5, 1993 | Yamamoto |

Other Prior Art

Von Nostrand's Scientific Encyclopedia, Page 1711, article on springs, 1968.

Shingly and Mitchell, Mechanical Engineering Design, Pages 469 through 472, section on helical torsion springs, McGraw Hill Series in Mechanical Engineering, 1983.

Shingly, et al. teaches helical torsion springs having a constant spring rate. This invention is distinguishable from Shingly, et al. in that, inter alia, it provides a means to adjust a spring rate of the torsion spring to match a spring rate desired for optimal performance in the application for which the torsion spring is utilized.

The patent to Shamir teaches two concentric helical springs for use in an arm wrestling apparatus. The inner helical spring is adjustably placed in tension and the outer helical spring placed in compression to adjust a force necessary to bend the springs. This invention is distinguishable from Shamir in that, inter alia, it adjusts a torsional spring rate of the spring.

The other prior art listed above, but not specifically distinguished above, diverge even more starkly from this invention than do the prior art specifically distinguished above.

SUMMARY OF THE INVENTION

The adjustable torsion spring of this invention includes a spring formed from wire wound helically into a coil which is substantially cylindrical in appearance. The wire extends from a first end of the coil to form a first arm and extends from a second end of the coil to form a second arm. The first arm and second arm provide means to input and output torque between the adjustable torsion spring and other elements of a mechanical system. A hollow core is provided within the coil of the spring which is defined by an inside diameter of the coil of wire. The wire extends from the first end of the coil to the second end of the coil through a series of courses, each course representing one turn of the wire about the coil. A groove is provided between each course of wire, these grooves are each attached such that they essentially form a single helically spiraling groove extending along the length of the coil from the first end to the second end. These grooves are exhibited both within the core of the coil and upon an outer surface defined by an outside diameter of the coil.

When the first arm and second arm are pivoted about a central axis passing through the core, so that they are displaced angularly with respect to each other, the inside diameter and outside diameter of the coil are modified. A means to resist coil diameter modification is provided adjacent the coil. The resistance means inhibits a portion of the coil of the spring from changing in diameter when the spring is loaded with torque. The resistance means is adjustable to control a variable number of courses of the coil. When an additional number of courses are controlled, the spring rate is increased. When a number of courses of the coil that are controlled is decreased, the spring rate is decreased.

In one form of the invention, the diameter control means takes the form of a structure having a diameter similar to an inside diameter of the coil which is inserted partially into the core. The farther the structure is inserted into the core, the more courses of the coil are controlled and the greater the spring rate becomes. When an exterior surface of the structure is sized and shaped with an appropriate threading surface, the structure can be threaded into and out of the core by rotating along the helical pattern of the grooves upon the inside diameter of the coil.

OBJECTS OF THE INVENTION

Accordingly, it is a primary object of the present invention to provide a torsion spring which has an adjustable spring rate.

Another object of the present invention is to provide a torsion spring which can resist torque at a rate selected by a user.

Another object of the present invention is to provide a torsion spring which can store an adjustable amount of energy.

Another object of the present invention is to provide a structure for modifying a spring rate of a torsion spring by restraining a portion of the torsion spring from being adjusted in diameter when loaded.

Another object of the present invention is to provide a torsion spring which is readily manufactured from commonly available materials is of durable construction and provides for safe operation.

Another object of the present invention is to provide a mechanical element which provides resiliency to a system, the resiliency of the mechanical element being adjustable to match the performance criteria desired.

Viewed from a first vantage point, it is an object of the present invention to provide a torsional spring having an adjustable resistance to torsional loads, comprising in combination: a main spring having a plurality of courses of wire surrounding a central axis of said spring, each course being substantially circular, said courses forming a coil of wire extending from a first end to a second end, said coil having an inside diameter defining a core of said coil, said main spring exhibiting a resistance to torsional loads, and a means to adjust a resistance of said main spring to torsional loads applied about said central axis.

Viewed from a second vantage point, it is an object of the present invention to provide a method for adjusting a resistance of a torsional spring to torsional loads, including the steps of: providing a main spring including a coil of wire extending from a first end to a second end, the coil having an inside diameter defining a core of the main spring, inserting a means to resist reduction of the inside diameter partially into the core such that portions of the coil adjacent the reduction resistance means resists reduction, determining what amount of torsional load resistance is desired for the main spring, and altering a proportion of the core which contains the reduction resistance means until the desired amount of torsional load resistance is exhibited by the main spring.

Viewed from a third vantage point, it is an object of the present invention to provide an apparatus for modifying a spring rate of a spring having $N_o$ total number of turns, comprising in combination: $N_v$ turn disabling means operatively coupled to said spring such that an effective spring rate is determined by the formula:

$$k_e = \frac{d^4 E}{CD(N_o - N_v)}$$

where $k_e$ is said effective spring rate for said spring, d is a diameter of wire forming said spring, E is a modulus of elasticity of a material forming said spring, C is a constant between 1 and 1,000, and D is an average of unloaded diameter of said spring.

These and other objects will be made manifest when considering the following detailed specification when taken in conjunction with the appended drawing figures.

BRIEF DESCRIPTION OF THE DRAWINGS

FIG. 1 is a perspective view of the adjustable torsion spring of this invention.

FIG. 2 is a front view of that which is shown in FIG. 1.

FIG. 3 is a sectional view taken along line 3—3 of FIG. 1, revealing interior details of the adjustable spring of this invention.

FIG. 4 is a side view of that which is shown in FIG. 1.

FIG. 5 is a perspective view of an alternative embodiment of the adjustable torsion spring of this invention.

FIG. 6 is a perspective view of another alternative embodiment of the adjustable torsion spring of this invention.

FIG. 7 is a front view of yet another alternative embodiment of the adjustable torsion spring of this invention.

FIG. 8 is a full section front view of still another alternative embodiment of the adjustable torsion spring of this invention.

DESCRIPTION OF PREFERRED EMBODIMENTS

Referring to the drawings, wherein like reference numerals represent like parts throughout, reference numeral 10 is directed to an adjustable torsion spring having a spring rate which is adjustable.

In essence, and with reference to FIG. 1, the adjustable torsion spring 10 includes an outer main spring 20 and an inner adjustment spring 60. The main spring 20 is formed from main spring wire 22 wrapped into a coil 30 and extending from a first end 24 of the coil 30 to a second end 26 of the coil 30. The main spring wire 22 extends from the first end 24 with a first arm 28 and the main spring wire 22 extends from the second end 26 with a second arm 29. The coil 30 includes a hollow core 50 oriented along a central axis D of the coil 30.

The adjustment spring 60 is provided which is partially nested within the core 50 of the main spring 20. The adjustment spring 60 is formed from adjustment wire 62 wound into a helix 70 extending from a near end 64 within the core 50 to an adjustment end 66 extending out of the core 50. The helix 70 is formed to exhibit an exterior diameter 74 similar to an inside diameter 33 of the coil 30 of the main spring 20. The adjustment spring 60 thus prevents a portion of the inside diameter 33 of the coil 30 from being reduced when the main spring 20 is loaded with torque through the first arm 28 and second arm 29.

More specifically, and with reference to FIGS. 1 and 2, details of the outer main spring 20 are described. The main spring 20 is essentially a helical torsion spring in form. The main spring 20 is formed from main spring wire 22 preferably having a constant thickness 23 along its entire path through the main spring 20. The main spring wire 22 is wrapped into a coil 30 which is substantially a cylinder with the main spring wire 22 having a constant distance away from the central axis D along a length 38 between the first end 24 and the second end 26 of the coil 30.

A first arm 28 of main spring wire 22 extends away from the first end 24 of the coil 30 in a direction substantially perpendicular to the central axis D. A second arm 29 is formed from main spring wire 22 extending away from the second end 26 of the coil 30 in a direction substantially perpendicular to the central axis D. The first arm 28 and second arm 29 preferably remain within separate parallel planes perpendicular to the central axis D which are spaced from each other by a distance which is similar to the length 38 of the coil 30. The first arm 28 remains substantially within a plane including the first end 24 and the second arm 29 remains substantially within a plane including the second end 26.

The main spring wire 22 forms the coil 30 by providing multiple courses 40, or turns, along the length 38 of the coil 30. Preferably, the main spring wire 22 is circular in cross section such that the courses 40 provide a curved surface to the core 50 of the coil 30. The inside diameter 33 is defined by a distance between a crest of each course 40 and the central axis D, multiplied by two (FIG. 3). A groove 42 is located between each course 40 of the main spring wire 22. In essence, the grooves 42, when considered together, are actually a single groove spiraling helically between the courses 40 of the main spring wire 22. When the main spring wire 22 exhibits a circular cross section, the grooves 42 exhibit a "V"-shaped appearance when viewed in section (see FIG. 3).

Preferably, the main spring wire 22 is configured such that the courses 40 are adjacent each other and the grooves 42 end at a midpoint between an inside diameter 33 of the coil 30 and an outside diameter 32 of the coil 30. The coil 30 has an outer surface 52 which exhibits similar characteristics to the core 50 in that the grooves 42 and courses 40 provide the outer surface 52 with an undulating appearance.

With reference to FIG. 4, the first arm 28 and second arm 29 preferably are angularly displaced from each other slightly, by angle c, when the main spring 20 is in an unloaded configuration. When the first arm 28 is angularly displaced along arrow A away from the second arm 29, by an amount represented by angle β of FIG. 4, the main spring 20 resists this relative motion between the first arm 28 and the second arm 29. As a result of this motion along arrow A, the inside diameter 33 of the coil 30 is caused to be reduced slightly.

With reference now to FIGS. 1 through 3, details of the adjustment spring 60 are described. The adjustment spring 60 provides resistance to the main spring 20 from having an inside diameter 33 of the coil 30 decrease when the main spring 20 is loaded with torque. While the adjustment spring 60 is the preferred means to resist this inside diameter 33 modification, other elements could be used to similarly inhibit the main spring 20 from being modified in diameter when torsionally loaded.

The inner adjustment spring 60 is formed from adjustment spring wire 62 wrapped into a helix 70. The adjustment spring wire 62 preferably is circular in cross section and exhibits a width 63 similar to a thickness 23 of the main spring wire 22. Preferably, the adjustment spring wire 62 is formed from a similar material as that from which the main spring 20 is formed. The adjustment spring wire 62 extends from a primary near end 64 at one end of the helix 70 to a secondary adjustment end 66 at an opposite end of the helix 70. The helix 70 is preferably substantially cylindrical in form with an interior 90 generally analogous to the core 50 of the main spring 20. The helix 70 includes an exterior surface 92 having an exterior diameter 74 defining a maximum extent of the adjustment spring wire 62 away from the central axis D. The interior 90 has an interior diameter 76 defining a minimum extent of the adjustment spring wire 62 away from the central axis D.

The adjustment spring wire 62 extends from the adjustment end 66 of the helix 70 to form a half circular loop 68 oriented in a plane substantially coplanar with the central axis D. The loop 68 provides one form of rotational input to the adjustment spring 60 to allow the adjustment spring 60 to be rotated, along arrow B of FIG. 1. However, various different forms of angular input to the adjustment spring 60 can be provided.

Because of the circular cross section of the adjustment spring wire 62, the helix 70 exhibits a plurality of humps 80 and notches 82 along the extent 78 of the helix 70 between the near end 64 and the adjustment end 66. One hump 80 is provided for each turn of the adjustment spring wire 62 forming the helix 70. The exterior diameter 74 is defined by a distance between the crests of the humps 80 and the central axis D, multiplied by two (FIG. 3). One notch 82 is oriented between each of the humps 80.

The notches 82, when viewed together, are actually a single notch spiraling helically between the humps 80 of adjustment wire 62 extending along the helix 70. Similarly, the humps 80 are actually a single hump spiraling helically along the extent 78 of the helix. The humps 80 and notches 82 are exhibited both within the interior 90 of the adjustment spring 60 and upon the exterior surface 92 of the adjustment spring 90.

Each hump 80 of the helix 70 is preferably oriented in contact with adjacent humps 80 of the helix 70. Thus, a pitch of the humps 80 of the adjustment spring 60 is similar to a pitch of the grooves 42 within the core 50 of the main spring 20. The exterior diameter 74 of the adjustment spring 60 is substantially equal to the inside diameter 33 of the main spring 20. Thus, the adjustment spring 60 can be threaded into the core 50 of the main spring 20 with the humps 80 and grooves 42 acting as complemental threads. An overlapping length 79 is defined by the adjustable amount which the main spring 20 overlaps the adjustment spring 60.

Preferably, the exterior diameter 74 of the adjustment spring 60 is slightly greater than the inside diameter 33 of the main spring 20. This slight oversizing of the exterior diameter 74 of the adjustment spring 60 causes the humps 80 to pass slightly into the grooves 42 of the main spring 20 and prevent axial translation of the adjustment spring 60, along arrow C, without rotation of the adjustment spring 60.

The adjustment spring 60 prevents portions of the inside diameter 33 of the main spring 20 from being reduced when the main spring 20 is loaded with torsional loads through the first arm 28 and second arm 29. Preferably, the adjustment spring 60 is oriented with only the near end 64 of the helix 70 located within the core 50 and with the adjustment end 66 of the helix 70 outside of the core 50 of the main spring 20. Thus, only a portion of the coil 30 of the main spring 20 has the inside diameter 33 prevented from contracting by the adjustment spring 60. This proportion of the core 50 which includes the adjustment spring 60 determines how much the spring rate of the main spring 20 is modified to provide the adjustable torsion spring 10 with the desired characteristics.

While the adjustment spring 20 is the preferred means to restrain the coil 30 of the main spring 20 from adjusting in diameter, other elements may be provided to adjust the spring rate of the torsion spring 10. For instance, a threaded shaft having an appropriately pitched thread and outside diameter similar to the inside diameter 33 can be utilized to thread into the core 50 of the main spring 20. An inflatable bladder could be oriented entirely within the core 50 and coupled to a source of compressed air such that as a pressure within the bladder increases, a force opposing contraction of the inside diameter 33 of the coil 30 would be increased. Similarly, an air bladder could surround the coil 30 or a threaded sleeve could be configured to overlie the outer surface 52 to prevent expansion of the outer surface 52 if the first arm 28 and second arm 29 are pivoted in a direction opposite that shown by arrow A of FIG. 4.

Referring to FIGS. 5 through 8, various alternative embodiments of the torsion spring 10 are shown. While these alternative embodiments each exhibit a slightly different structure, they similarly either restrict a main torsion spring 120, 220, 320, 420 from decreasing in diameter or increasing in diameter in an adjustable manner so that a spring rate of the main spring 120, 220, 320, 420 can be adjusted.

With reference to FIG. 5, a screw core adjustable spring 110 is described. The spring 110 is similar to the torsion spring 10 of the preferred embodiment except that the adjustment spring 60 of the preferred embodiment is replaced with a bolt 160. The bolt 160 includes threads T which are configured with a pitch and inner and outer diameter such that the threads T can nest within grooves of the main spring 120 similar to the grooves 42 of the main spring 20 of the preferred embodiment. When the bolt 160 is rotated about arrow H, the bolt 160 is caused to translate along arrow E into the main spring 120. As the position of the bolt 160 is modified, the spring rate of the main spring 120 is modified.

With reference to FIG. 6, details of an inflatable core torsion spring 210 are described. The spring 210 includes a main spring 220 similar to the main spring 20 of the preferred embodiment. A core of the main spring 220 is provided with an inflatable cylinder 260 in place of the adjustment spring 60 of the preferred embodiment. When a spring rate of the main spring 220 is to be adjusted, air is supplied into the inflatable cylinder through conduit 261. The inflatable cylinder 260 has a flexible exterior such that as air pressure builds up within the inflatable cylinder, a diameter of the inflatable cylinder 260 tends to increase. The inflatable cylinder 260 thus applies a pressure P against the main spring 220 discouraging the main spring 220 from decreasing in diameter when the main spring 220 is loaded torsionally. Hence, when a user wishes to adjust a spring rate of the main spring 220, additional air is supplied to the inflatable cylinder 260 until a desired spring rate for the main spring 220 is achieved.

With reference to FIG. 7, an inflatable sleeve torsion spring 310 is described. The spring 310 includes a main spring 320 similar to the main spring 20 of the preferred embodiment. An inflatable sleeve 360 is provided overlying an exterior of the main spring 320. The inflatable sleeve 360 includes an air line 361 operatively coupled thereto which can deliver air into and out of the inflatable sleeve 360. The inflatable sleeve 360 is dimensioned such that when air is supplied through the air line 361, a pressure P is exerted by the inflatable sleeve 360 against the main spring 320. This pressure P discourages the main spring 320 from increasing in diameter.

When the spring rate of the main spring 320 is to be adjusted, an amount of air within the inflatable sleeve 360 is adjusted to provide the necessary resistance to main spring 320 diameter increase. The inflatable sleeve 360 thus has a similar effect upon the main spring 320 as the inflatable cylinder 210 has upon the main spring 220. However, the inflatable cylinder 260 is useful when the main spring 220 is loaded torsionally in one direction tending to cause the main spring 220 to decrease in diameter. The inflatable sleeve 360 is useful when the main spring 320 is loaded in an opposite direction tending to cause the main spring 320 to increase in diameter.

With reference to FIG. 8, details of an outer adjustment torsion spring 410 are described. The spring 410 includes a main spring 420 somewhat analogous to the main spring 20 of the preferred embodiment. The main spring 420 has an adjustment spring 460 overlying an outer surface of the main spring 420. The main spring 420 has a greater diameter core 441 and a lesser diameter core 442 forming opposite halves of the main spring 420. The greater diameter core 441 has a greater diameter 431 and the lesser diameter core 442 has lesser diameter 432.

The greater diameter core 441 positions the main spring 420 adjacent the adjustment spring 460 when in an unloaded condition. The lesser diameter core 442 is sufficiently narrower than a diameter of the adjustment spring 460 that the lesser diameter core 442 does not touch the adjustment spring 460. Thus, only a portion of the adjustable spring 460 which overlies the greater diameter core 441 of the main spring 420 actually contacts the main spring 420.

A gap 450 is located between the lesser diameter core 442 of the main spring 420 and the adjustment spring 460. When a user wishes to modify a spring rate of the main spring 420, the adjustment spring 460 is rotated about arrow G so that the adjustment spring 60 is caused to translate along arrow F along the main spring 420. As an amount of overlap between the adjustment spring 60 and the greater diameter core 441 of the main spring 420 is modified, a spring rate of the main spring 420 is modified.

In use and operation, and with reference to FIGS. 1 through 4, the adjustable torsion spring 10 is utilized in the following manner. Initially, the main spring 20 is configured coaxial with the adjustment spring 60 along the central axis D, but with the adjustment spring 60 spaced from the core 50 of the main spring 20. In this configuration, the main spring 20 exhibits a substantially constant spring rate which can be calculated from the following formula:

$$k = \frac{d^4 E}{64 \, DN} \quad \text{(formula 1)}$$

where d=thickness 23 of the main spring wire 22.

E=modulus of elasticity for the main spring wire 22 material.

D=average of the exterior diameter 74 and the interior diameter 76 of the coil 30 of the main spring 20.

N=Number of courses 40, or turns, within the coil 30 when not loaded.

An amount of torque necessary to displace the first arm 28 and second arm 29 relative to each other by angle β of FIG. 4 is represented by the formula:

$$T = k\beta, \quad \text{(formula 2)}$$

where

T is the torque supplied between the first arm 28 and second arm 29 k=the spring rate for the torsion spring 10.

β=the angular displacement between the first arm 28 and the second arm 29 when the torque T is applied.

As is shown by formula 2, as the first arm 28 and the second arm 29 are displaced to greater and greater angles of displacement β, an amount of torque T necessary to achieve this angular displacement β increases. The spring rate k determines how much torque T is exerted by the spring 20 when the spring 20 is displaced by angle β.

When a user desires to have the spring rate k of the main spring 20 modified, the user locates the adjustment spring 60 adjacent the core 50 of the main spring 20 and rotates the adjustment spring 60 along arrow B, threading the adjustment spring 60 into the core 50 of the main spring 20. With the adjustment spring 60 partially threaded into the core 50, a portion of the coil 30 of the inside diameter 33 is prevented from decreasing when the first arm 28 and second arm 29 are angularly displaced along arrow A. The main spring 20 thus effectively has the number of courses 40, or turns, of the coil 30 which can contract, decrease to a smaller amount. This adjustment procedure causes the effective spring rate of the spring 20 according to the formula:

$$k_e = \frac{d^4 E}{CD(N_o - N_v)} \quad \text{(formula 3)}$$

where $k_e$ is the effective spring rate when the adjustment spring 60 is utilized C is a constant between 1 and 1,000 which is preferably 64

$N_o$ is the number of turns in the main spring 20, and $N_v$ is the number of turns of the main spring that overlie the adjustment spring 60.

As shown in formula 3, this reduction in the number of turns, $N_o-N_v$, of main spring wire 22 causes the effective spring rate ke for the main spring 20 to be increased. Hence, an amount of torque necessary to achieve similar arcuate displacement of the first arm 28 with respect to the second arm 29, along arrow A, to be increased. If a larger spring rate is desired, the adjustment spring 60 can be further rotated along arrow B (FIG. 1), causing the adjustment spring 60 to be inserted still further into the core 50 along arrow C (FIG. 2). If a user desires that the spring rate of the main spring 20 be reduced, the adjustment spring 60 can be rotated in the direction opposite arrow B, causing the adjustment spring 60 to migrate out of the core 50 of the main spring 20.

The adjustment spring 60 can be rotated along arrow B either manually or with an additional apparatus such as a motor having an output shaft coupled to the loop 68. If a motor is utilized, the motor can be controlled by a user directly or as part of a control system for the mechanical device including the torsion spring 10. Thus, the adjustable torsion spring 10 can form part of a feedback circuit where a spring rate of the torsion spring 10 is continuously undergoing adjustment to optimize the performance characteristics of the system.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A torsion spring having an adjustable resistance to torsional loads, comprising in combination:

a main spring having a plurality of courses of wire surrounding a central axis of said main spring, said courses forming a coil of wire extending from a first end to a second end, said main spring including means to resist a torsional load applied thereto, a means removably attachable to said main spring to variably adjust a resistance of said main spring to the torsional load, whereby a manner in which said variably adjustable resistance means attaches to said main spring controls a spring rating of said main spring, and wherein said variably adjustable resistance means includes means to inhibit modification of a diameter of said coil.

2. The spring of claim 1 wherein said coil is substantially circular in cross section and includes a core having an inside diameter, and wherein said diameter modification inhibiting means includes a structure partially within said core of said coil, said structure having a width not less than said inside diameter of said coil.

3. The spring of claim 2 wherein said structure includes an adjustment spring, said adjustment spring having an exterior diameter not less than said inside diameter of said coil.

4. The spring of claim 3 wherein said inside diameter of said coil is substantially constant between said first end and said second end.

5. The spring of claim 4 wherein said adjustment spring has a substantially constant exterior diameter greater than said inside diameter of said coil.

6. The spring of claim 5 wherein said adjustment spring is formed from a helix of adjustment wire, said adjustment wire having a width similar to a thickness of said wire of said main spring.

7. The spring of claim 6 wherein said core of said main spring includes a helically spiraling groove between each course of said main spring, said groove extending away from said central axis beyond said inside diameter of said coil, said adjustment spring including a helically spiraling hump on an exterior surface thereof, said hump having a shape causing a portion of said hump of said adjustment spring that is oriented within said core of said main spring to extend away from said central axis beyond said inside diameter, such that said hump is threaded within said groove of said main spring.

8. The spring of claim 7 including a loop coplanar with said central axis at an end thereof, whereby said adjustment spring can be rotated and translated into and out of said core.

9. The spring of claim 8 wherein said main spring includes at least two arms including a first arm and a second arm with one of said two arms fixedly attached to said first end and the other of said two arms fixedly attached to said second end, whereby torsional loads can be applied to said main spring.

10. The spring of claim 9 wherein said adjustment spring includes a near end threaded within said core of said main spring and an adjustment end on a side of said helix of said adjustment spring opposite said near end, said adjustment end including said loop thereon, said hump of said adjustment spring having a width similar to a width of said groove of said main spring.

11. A method for adjusting a resistance of a torsional spring to torsional loads, including the steps of:

providing a main spring including a coil of wire extending from a first end to a second end, the coil having an inside diameter defining a core of the main spring and an outside diameter defining an outer surface of the main spring, juxtaposing a means to resist modification of either the inside diameter or the outside diameter adjacent a portion of the coil, such that portions of the coil adjacent the diameter modification resistance means resist modification, determining what amount of torsional load resistance is desired for the main spring, and translating the diameter modification resistance means along a common central axis of the coil and the diameter modification resistance means until the desired amount of torsional load resistance is exhibited by the main spring.

12. The method of claim 11 including the further step of configuring the diameter modification resistance means as an adjustment spring, the adjustment spring including a helix of adjustment wire extending from a near end to an opposite adjustment end, said adjustment spring having an exterior diameter not less than the interior diameter of the main spring, and locating the adjustment spring partially within the core of the main spring.

13. The method of claim 12 wherein said translating step includes the step of modifying a proportion of the coil of the main spring that includes the adjustment spring nested therein.

14. The method of claim 13 including the further steps of:

determining a desired spring rate for the main spring, using a relationship between the spring rate of the main spring and a number of turns of the main spring to identify a number of turns the main spring requires to exhibit the desired spring rate, and moving the adjustment spring so that the adjustment spring is overlapped by all of the turns of the main spring except the number of turns identified in said using step.

15. The method of claim 14 wherein said using step includes utilizing the formula:

$$k_e = \frac{d^4 E}{64 D (N_o - N_v)}$$

where $k_e$ is a desired effective spring rate, d is the diameter of the wire forming the main spring, E is a modulus of elasticity of main spring material forming the main spring, D is an average unloaded diameter of the main spring $N_o$ is a total number of turns of the main spring, and $N_v$ is a number of turns of the main spring overlapping the adjustment spring, to determine the number of turns of the main spring which are to overlap the adjustment spring in said moving step.

16. An apparatus for modifying a spring rate of a torsion spring having $N_o$ total number of turns, comprising in combination:

turn disabling means operatively coupled to said spring so as to selectively vary an effective spring rate of said spring, said effective spring rate being determined by the formula:

$$k_e = \frac{d^4 E}{CD (N_o - N_v)}$$

where $k_e$ is said effective spring rate for said spring, d is a diameter of wire forming said spring, E is a modulus of elasticity of a material forming said spring, C is a constant between 1 and 1,000, and D is an average unloaded diameter of said spring $N_v$ is a number of turns of said spring which are disabled by said turn disabling means.

17. The apparatus of claim 16 wherein said turn disabling means includes a means to resist modification of D for $N_v$ number of turns of said spring.

18. The apparatus of claim 17 wherein the spring having $N_o$ total number of turns is a helical spring having a first end and a second end, said helical spring having a core with an inside diameter, said turn disabling means includes an inner helical spring having a primary end and a secondary end, said inner spring oriented partially within said core of said helical spring, said inner spring having an exterior surface with an exterior diameter not less than said inside diameter of said helical spring, means to adjust an amount of overlap of said helical spring over said inner spring, and wherein said ends of said inner spring and said outer spring each include means to transmit torque thereto.

19. The device of claim 18 wherein said helical spring is a torsion spring including at least one groove spiraling helically along said inner diameter of said core of said helical torsion spring and at least one hump spiraling helically along said exterior surface of said inner spring, and wherein said humps are spaced apart a similar distance to a space between said grooves, said inner spring having said exterior diameter sized greater than said inside diameter of said helical torsion spring, whereby translation of said inner spring into and out of said core of said helical torsion spring cannot occur without rotation of said nested springs relative to each other, such that said humps of said exterior diameter of said inner spring are threaded through said grooves of said inside diameter of said helical torsion spring.

* * * * *